AUTOMATIC FREQUENCY CONTROL SYSTEM
Filed May 16, 1952
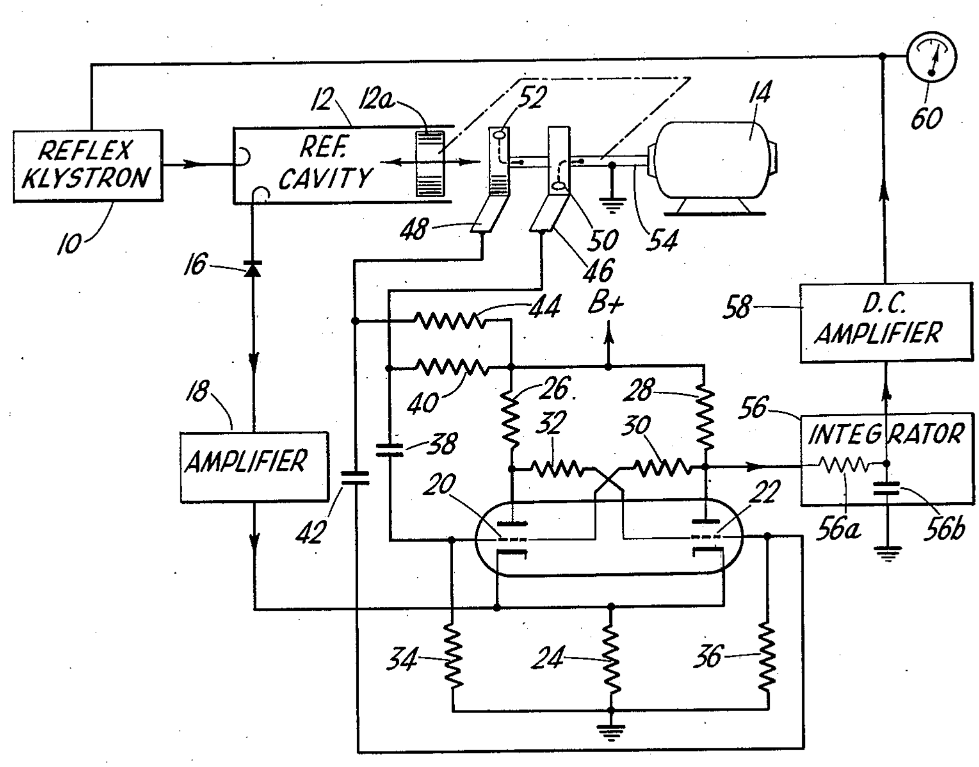
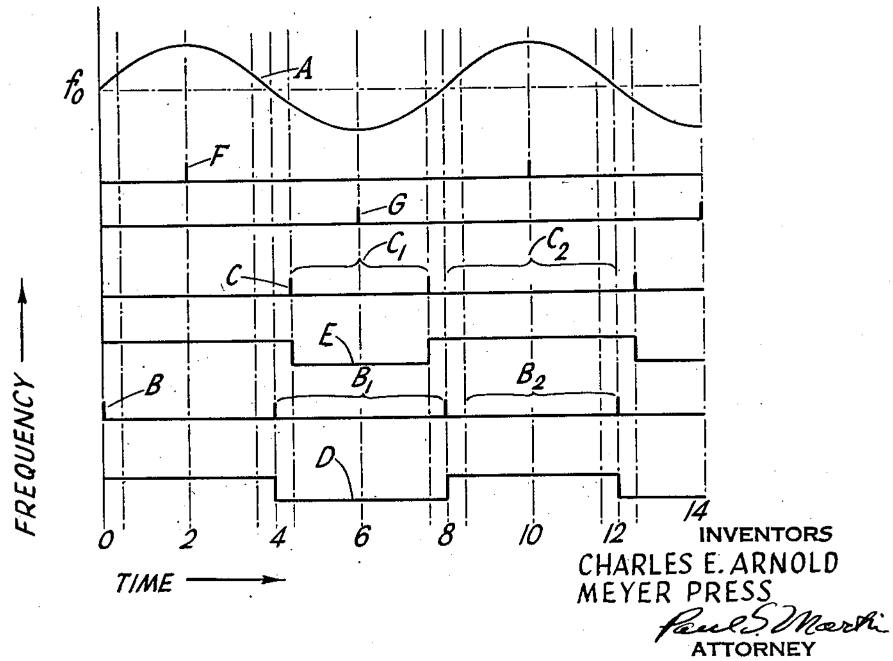
INVENTORS
CHARLES E. ARNOLD
MEYER PRESS
ATTORNEY United States Patent Office 2,764,682

Patented Sept. 25, 1956

2,764,682

AUTOMATIC FREQUENCY CONTROL SYSTEM

Charles E. Arnold, Milton, and Meyer Press, Dorchester, Mass., assignors to Sylvania Electric Products Inc., a corporation of Massachusetts Application May 16, 1952, Serial No. 288,148

4 Claims. (Cl. 250—36)

The present application relates to the measurement of oscillation frequencies especially in the microwave region and to the automatic frequency control of microwave oscillators.

At low frequencies it has been a common practice to employ paired resonant circuits tunded to frequencies above and below a center frequency for detecting departures from the center frequency. The detected output is thus measured, and is used for adjusting the frequency of an oscillator whose output is fed to the resonant circuits and to a load. Characteristically these circuit devices rely not only upon multiple resonators but additionally upon multiple rectifiers.

At microwave frequencies it has been considered necessary to use multiple crystal detectors and multiple cavities. The difficulty involved in constructing a microwave analog of a frequency discriminator or a ratio detector is that it is difficult to rely on the precise construction of two resonators whose accuracy is variable with thermal changes and various other influences; and more significantly it is almost impossible to obtain matched crystal detectors that will remain accurately matched over a long period of time.

An object of the present invention is to provide a frequency measuring system that depends upon the resonance of but a single cavity resonator.

A further object is to devise a frequency measuring system that depends upon no more than a single crystal detector.

An additional object is to devise an automatic frequency control system using only a single crystal and a single resonator.

One feature of the present invention resides in the production of a pulse at a time which depends upon sweep tuning of a resonator through a frequency range, the timings of the pulse being dependent upon the coincidence of the resonant frequency of the sweep tuned cavity with that of the frequency source to be controlled. In sweep tuning above and below resonance and detecting pulses produced by coincidence of resonance of the cavity with frequency of the signal source both above and below resonance the pulses should occur at predetermined intervals, and at regular intervals if the signal source is operating at the center frequency of the swept frequency resonator.

In the embodiment described in detail below a bi-stable multivibrator is used which is triggered by the resonator and detector first to one condition and then to the opposite condition. The output of this multivibrator is integrated, and the integrated output suitably amplified, to provide a direct-current voltage that is a measure of the signal source frequency. Where the signal source is an electrically tunable klystron for example, this direct current is used for adjusting and maintaining the tuning in adjustment. If the integral rises or falls, as will be the case where the rectified pulses do not occur at the predetermined intervals, a change in direct current output will result and a change in tuning will be effected.

Various further features of novelty and objects will be better appreciated from the following detailed disclosure of an illustrative embodiment shown in the accompanying drawings. In the drawings:

Fig. 1 is a wiring diagram, partly in block diagram form of an illustrative embodiment of the invention;

Fig. 2 is a timing chart illustrating various operating conditions possible in the system represented by Fig. 1.

Referring first to Fig. 1 there is seen an electrically tunable oscillator 10, for example a reflax klystron that is tunable by varying its repeller voltage or by means of a well known electrical-thermal tuning arrangement. The bulk of the energy of oscillator 10 is fed to a load (not shown) by a main output coupling. Additionally, either from that output coupling or from a separate one in the oscillator, a sample of the signal energy is coupled to a reference cavity resonator 12.

The range of tuning of reference cavity 12 is wide compared to the tuning range and to the expected error or departure of the oscillator frequency from the desired frequency. Reference cavity resonator 12 is illustrated as having an axially reciprocable tuning plunger 12*a*, but a wide variety of other tuning arrangements will occur to those skilled in the art, such for example as an eccentric metal wheel that might enter the space of the cavity to a variable extent, or a dielectric plunger. The tuning element 12*a* is in any event coupled to a cyclic operator such as motor 14. The tuning sweeps from one extreme to the other and then reversely, in uniform cycles. The speed is not critical but it should not vary between half-cycles.

In operation it is apparent that cavity 12 will not be resonant at the operating frequency of oscillator 10 except at brief moments during the mechanical sweep of plunger 12*a*.

During these brief periods of resonance a high level of signal energy will be developed in the cavity.

A single crystal detector 16 is coupled to cavity 12 and to amplifier 18. The crystal detector rectifies the high frequency signal surges, which, when amplified and sharpened in the unit 18, are delivered as a series of negative pulses.

The correct operating frequency of the klystron or like signal source will be attained where the pulse output repeats at certain, predetermined intervals, indicating that as the mechanical tuner sweeps up and back it passes through resonance at the same, center frequency times. In Fig. 2 curve A represents the resonant frequency of cavity 12 above and below the desired oscillation frequency $F_o$, varying with time in the manner determined by motor 14 and tuning slide 12*a*. The pulses at the output of crystal 16 occur as the sweep-frequency of the cavity passes through the oscillator frequency when operating at the desired frequency as represented by curve B. Pulses are indicated here as being spaced in equal intervals B1 and B2, where $F_o$ is half-way between the extremes of curve A and that curve is symmetrical above and below $F_o$. This condition is not necessary, and B1 may differ from B2 as will be seen, but they should not differ excessively.

Where the operating frequency of klystron 10 is anything other than the predetermined frequency of the reference cavity 12, pulses C will be produced at the output of crystal 16, occurring at different intervals C1 and C2.

The crystal output, as amplified and pulse-sharpened by amplifier 18 is fed to a modified form of Eccles-Jordan bi-stable multivibrator, coupled to the cathode thereof as shown in Fig. 1. This multivibrator includes two triode sections 20 and 22 having a common cathode resistor 24 and separate plate resistors 26 and 28. The grid of section 20 is coupled through a resistor 30 to the plate of section 22 and similarly the grid of section 22 is coupled through a resistor 32 to the plate of section 20. The grid of section 20 is additionally returned to ground, the negative return of resistor 24, through a grid return resistor 34 and similarly the grid of section 22 has a grid return resistor 36. Each grid has a time constant circuit through which the Eccles-Jordan multivibrator may be reversed in condition independently of amplifier 18, including a capacitor 38 in series with a resistor 40 connected to the B-plus terminal and a second capacitor 42 energized through resistor 44 connected to the positive direct-current supply terminal. The junctions of resistor and condenser circuit 38—40 and 42—44, respectively, are joined to wiping contacts 46 and 48 for connection to ground through contacts 50 and 52 respectively and through the motor shaft 54. Thus, when contact 46 engages its contact 50, condenser 38 will be connected to ground and negative pulse will drive section 20 to its cutoff condition, assuming it were then in conducting condition. However, if section 20 were idle at this time then no effect would be produced. Similarly, section 22 may be rendered non-conducting by contacts 48—52 at times when it should desirably be non-conductive. The circuit shown represents a preferred embodiment in that two phasing mechanisms are shown, one for each of sections 20, 22, whereas only one such timing-adjustment circuit is required.

The output of the multivibrator is coupled to an integrater 56, including for example a resistor **56*a* and a capacitor 56*b* connected in series and grounded. The time constant of the integrating circuit, should be long in relation to the sweep-tuning rate of the cavity oscillator and in relation to the corresponding timing of the motor operated contacts. The junction of the elements 56*a*, 56*b* is coupled to a direct current amplifier 58, whose output is connected to the frequency controlled portion of the signal source 10. A properly calibrated meter 60 connected to amplifier 58 will indicate the actual operating frequency. Departure from correct operating frequency are corrected by the frequency control arrangement internal to oscillator 10. This may be a thermal cavity tuner or the repeller voltage may be adjusted for frequency control, or other suitable arrangement well known per se and not specifically forming part of the novelty hereof. The operation of the system is as follows. Assuming that a series of pulses B appear at the output of crystal 16, representing proper tuning of the klystron, the Eccles-Jordan multivibrator will be reversed at certain intervals so as to charge and discharge capacitor 56*b* in the integrating circuit. This multivibrator output is represented by curve D in Fig. 2. The average output voltage will appear at the input to the direct current amplifier 18 and the frequency-control mechanism of the signal source 10 will be correct for maintaining operation of source 10 at the desired frequency $F_o$. However, if the output of the integrator is such as to produce a different voltage, with either the positive or the negative excursion of curve E (Fig. 2) different from curve D, then there will be a changed D. C. output at the frequency adjustment portion of the tunable signal source, and the tuning will be corrected. The operating frequency of source 10 is thus dependent on only a single frequency control element 12 and on a single crystal 12, and it is also dependent on the D. C. voltage level at the output of the multivibrator and the amplifier 58**. Thus to adjust the whole system to a new automatically stabilized frequency it is necessary only to adjust the D. C. voltage appropriately and thereafter maintain that voltage with stability.

A significant advantage of this system lies in the fact that, regardless of the condition of the signal source at correct frequency or at any error frequency, the signal pulse produced at the low level signal level part of the system, at crystal 16, is at a substantial, useful value, and does not fade down into a noise level as is the case in so many known frequency control systems where control voltage approaches zero as the correct operating frequency is approached from an error position.

Any suitable reversing switch might be used in place of the Eccles-Jordan electronic switch illustrated, but this circuit is conveniently well suited to the purpose of reversing the polarity of voltage applied to integrator 56 in time with the pulses from the crystal detector 16 and the cavity 12. This multivibrator has the advantage that any error in phasing of the sweep-tuning of cavity 12 is automatically restored, by virtue of the motor-operated contacts and the control circuits connected thereto. The operation of these circuits is as follows: Contacts 50 and 52 are positioned to be engaged by the wipers at opposite extremes of the tuning cycle of tuning plunger **12*a*. One of these contacts energizes a control grid at one tuning limit and the other contact energizes its associated grid as the opposite sweep-tuning extreme is reached. In Fig. 2 a series of pulses F are produced by one of the contacts and a series of pulses G are produced by the other contact. In the event that a pulse F occurs at a time when its related grid is biased negatively so that its vacuum-tube section is not conductive, then the phasing of the unit is correct. However, if the negative pulse produced by the contacts occurs at a time when the related triode section is conductive then that section is driven into non-conductive condition and proper phasing of the tuning mechanism 12*a*** and the switching mechanism represented by the Eccles-Jordan multivibrator is restored.

Using two sets of contacts 46—50 and 48—52 facilitates adjustment of the system. One set of contacts would be nearly as effective.

The foregoing illustrative apparatus is adaptable to integration as a unit to achieve the results described. However, the results may also be effected in another aspect by employing separately available units such as a sweep-tuned resonator; a direct-current amplifier; a bi-stable electronic switch. Largely for this reason, both the method and the article-of-commerce forms of expression of the invention are included in the appended claims as provided in the patent statutes. A latitude of varied application and modification of the illustrative apparatus will be readily apparent to those skilled in the art, and therefore the appended claims should be accorded broad interpretation, consistent with the spirit and scope of the invention.

We claim:

1. Apparatus for detecting the departure of an oscillator from a desired oscillation frequency, including a single tunable resonator, cyclic tuning mechanism for sweep-tuning the resonator through a wide range including said desired frequency, switch means periodically operated by said cyclic tuning mechanism, a bi-stable electronic switch having input connections to said switch means, a detector coupled to said resonator for producing and applying to said electronic switch a series of pulses as the resonator passes through the operating frequency of the oscillator, said pulses being effective to periodically reverse said bi-stable switch and said switch means being further effective to insure a predetermined phasing of said bi-stable switch in relation to the sweep-tuning cycle, and an integrator energized by said bi-stable switch for providing a D.-C. voltage representation of the departure of the oscillator from the desired frequency.

2. Apparatus for detecting the departure of an oscillator from a desired oscillation frequency, including a single tunable resonator, cyclic tuning mechanism for sweep-tuning the resonator through a wide range including the desired frequency, input and output coupling means to the resonator for deriving a series of high-frequency energy pulses as the resonator passes through the operating frequency of the oscillator, a bi-stable multivibrator coupled to said coupling means and operative alternately and successively between energy translating and non-translating conditions in response to successive ones of said energy pulses, and means operating synchronously with said tuning mechanism for insuring a predetermined phasing of said multivibrator in relation to the operation of said cyclic tuning mechanism.

3. An apparatus for detecting the departure of an oscillator from a desired oscillation frequency, including a single tunable resonator coupled to said oscillator, cyclic tuning mechanism for rapidly sweep-tuning said resonator through a wide range on each side of and including said desired frequency, said range being, many times wider than the width of resonant frequency response of said resonator, said resonator including an output circuit in which is derived a succession of short-duration high-frequency energy pulses as said resonator passes through the operating frequency of said oscillator, a bi-stable multivibrator having a control circuit coupled to said output circuit and operative alternately and successively between energy translating and non-translating conditions in response to successive ones of said energy pulses applied to said control circuit, and integrating means coupled to an energy translating circuit of said multivibrator and responsive to the energy translated thereby for deriving energy having an average value varying with the frequency of said oscillator from said desired frequency.

4. An apparatus for automatically controlling a tunable oscillator having an operating frequency varying with the magnitude of a control potential applied thereto, a single tunable resonator, cyclic tuning means for rapidly sweep-tuning said resonator through a wide frequency range on each side of and including a desired operating frequency, said range being many times wider than the width of resonant frequency response of said resonator, means for supplying oscillations from said oscillator to said resonator to derive a series of short-duration high-frequency energy pulses as said resonator sweeps past the operating frequency of said oscillator, a bi-stable multivibrator coupled to said resonator and operative alternately and successively between energy translating and non-translating conditions in response to successive ones of said energy pulses, and means responsive to the energy translated by said multivibrator for deriving and applying to said oscillator a control potential of magnitude varying with the frequency of said oscillator from said desired frequency.

References Cited in the file of this patent

UNITED STATES PATENTS

| | | |
|---|---|---|
| 2,404,568 | Dow | July 23, 1946 |
| 2,462,294 | Thompson | Feb. 22, 1949 |
| 2,466,931 | Crandell | Apr. 12, 1949 |
| 2,475,074 | Bradley | July 5, 1949 |
| 2,542,372 | Taylor | Feb. 20, 1951 |
| 2,564,059 | Gensel | Aug. 14, 1951 |
| 2,594,263 | Munster | Apr. 22, 1952 |
| 2,611,092 | Smullin | Sept. 16, 1952 |